United States Patent [19]
Templin, Jr.

[11] Patent Number: 4,993,754
[45] Date of Patent: Feb. 19, 1991

[54] LIQUID LEVEL COPLANAR TRANSMITTER ADAPTER

[75] Inventor: James E. Templin, Jr., Burnsville, Minn.

[73] Assignee: Rosemount Inc., Eden Prairie, Minn.

[21] Appl. No.: 415,089

[22] Filed: Sep. 29, 1989

[51] Int. Cl.$^5$ .............................................. F16L 23/00
[52] U.S. Cl. ..................................... 285/189; 73/706; 285/155
[58] Field of Search ............... 285/155, 179, 132, 189; 73/299, 706, 700, 715

[56] References Cited

U.S. PATENT DOCUMENTS

| | | |
|---|---|---|
| 1,800,839 | 4/1931 | Lewin ............................... 285/155 X |
| 3,479,865 | 11/1969 | Sonnenberg et al. ................ 73/299 |
| 3,760,842 | 9/1973 | Mikiya ............................. 285/155 X |
| 4,201,081 | 5/1980 | Bonomo ............................ 73/706 X |
| 4,722,228 | 2/1988 | Awa et al. ........................ 73/706 |
| 4,745,810 | 5/1988 | Pierce et al. ...................... 73/706 |
| 4,798,089 | 1/1988 | Frick et al. ....................... 73/706 |
| 4,833,922 | 5/1989 | Frick et al. ....................... 73/706 X |

FOREIGN PATENT DOCUMENTS 00944429 11/1982 European Pat. Off.
1467957 5/1974 United Kingdom.

OTHER PUBLICATIONS

Brochure of "Model 1151LLT Alphaline Flange Mounted Liquid Level Transmitter", published Sep. 1983, entitled *Drawings and Schematics*.
Data Sheet Entitled, "*Model 1151DP/GP and Model 1144G Transmitters*".

*Primary Examiner*—Eric K. Nicholson
*Attorney, Agent, or Firm*—Kinney & Lange

[57] ABSTRACT

An adapter for coupling a pressure transmitter to a vessel or tank carrying a liquid therein that establishes a hydrostatic pressure at a flanged opening has a planar surface that includes two spaced apart pressure ports that are aligned with and will mate with the isolator input ports of a differential pressure transmitter. The pressure ports are arranged so that the transmitter can be mounted very close to a side wall of the vessel or tank, with the hydrostatic pressure sensing port positioned closest to the vessel to eliminate errors caused by tilting of the adapter and transmitter from bulges that may occur in the vessel or tank side wall. Additionally, the adapter planar surface mounts the transmitter facing sideways, where the transmitter can be quite easily serviced, replaced, or examined.

10 Claims, 3 Drawing Sheets

LIQUID LEVEL COPLANAR TRANSMITTER ADAPTER

BACKGROUND OF THE INVENTION

1. Field of the Invention

The present invention relates to a flange for coupling a coplanar transmitter to a tank or vessel to provide precision level and specific gravity (density) measurements for contents of tank.

2. Description of the Prior Art

Sensing pressure of the liquid head has been known as a way of determining liquid levels in storage tanks. Industry standards (ANSI, DIN Standards) have been established for the flanges on the tank to which the pressure sensor attaches. It is desirable to use self-contained isolated coplanar differential pressure transmitters for sensing because of the simplicity of construction and reliable operation of such transmitters. Transmitters which have isolation diaphragms which open to the pressure to be sensed and which lie on a common plane are desired. Coupling such reference transmitter to a standard ANSI or DIN flange has caused a problem. It is desirable to keep the high side isolator of the transmitter as close to the tank as possible, keep it free of crevices and yet provide access to coupling bolts. The present adapter permits such usages.

SUMMARY OF THE INVENTION

The present invention relates to an adapter for mounting a transmitter that has a differential pressure sensing unit with isolation diaphragms, one of which opens to the fluid being sensed and the other to a reference fluid (gas or liquid) pressure, comprising a housing that provides passageways for carrying the pressure signals, and having coplanar openings that mate with the coplanar isolator diaphragms of the transmitter. The adapter housing is made so that the passageway carrying the liquid that is to be sensed is closest to the coupling flange that mounts the adapter in place on a tank, to minimize the amount of overhang and resulting change in relative position of the high side isolator of the transmitter if the tank bulges at the mounting flange and tilts the transmitter.

The adapter housing has integral vent-drain ports located close to the isolator diaphragms of the transmitter, so that when necessary, the passageways can be vented and drained for calibration or for removing contaminants. A valve can be used so the transmitter is capable of being isolated from the tank for service. The passageways leading to the transmitter then can be drained, flushed and zeroed. The integral drain ports in the adapter housing provide for ease of drainage. Separate pressure sources can also be attached through the integral ports in the adapter housing that are independent of the tank access opening to permit checking the span of the transmitter. The same ports permit bleeding air bubbles out of the system if necessary.

The surface on the adapter housing that mounts the coplanar transmitter isolator flange is at right angles to the plane of the flange on the tank, which helps to insure that the transmitter inlet will not move greatly as the tank bulges when it is filled with a product. There will be less vertical movement of the high side isolator of the transmitter, which affects accuracy of the measurement.

The assembly and disassembly of the adapter and transmitter is facilitated because the transmitter itself is in a position which does not restrict access to the mounting bolts.

The passageway that transmits the liquid to be sensed to the pressure inlet isolator on the high pressure side of the transmitter is of large diameter, and has adequate draft angles to allow bubbles to migrate away from the isolation diaphragm of the transmitter.

DETAILED DESCRIPTION OF THE PREFERRED EMBODIMENTS

Figure 1:
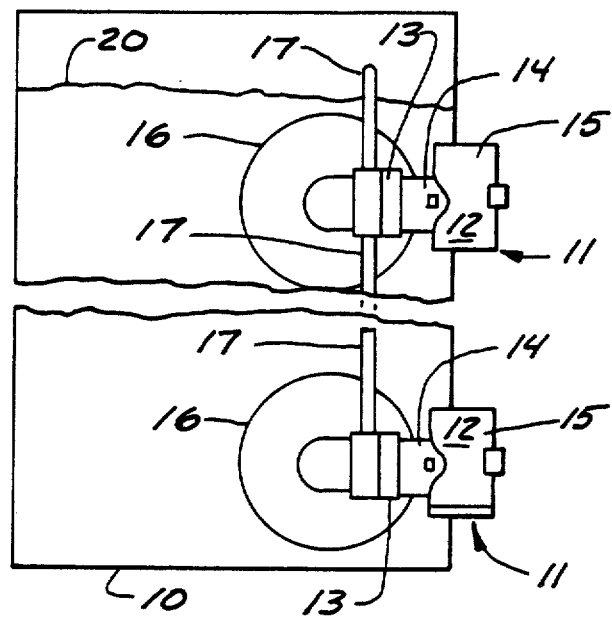
FIG. 1 is a schematic representation of a typical installation for determining precision density or level utilizing the adapter made according to the present invention.

In FIG. 1, a typical installation is shown for measuring the level or density of a large tank or vessel indicated at 10, utilizing differential pressure transmitter assemblies indicated at 11,11 near the top and bottom, which includes an adapter housing for mounting isolated input differential pressure transmitters 12,12 that have coplanar isolating diaphragms mounted at the inlets to isolation modules 13,13 at the ends of the transmitters.

Each transmitter 12 includes a pressure sensing module 14 between the isolation module and an electronics housing 15 in which suitable electronic circuits for providing an output signal are housed. Each transmitter has a differential pressure sensor in the sensor module 14, which senses the head or hydrostatic pressure in the vessel or tank 10 at the level of its coupling flange 16 that is mounted on the tank in a desired location. An optional low pressure line 17 is connected to a low pressure side of each transmitter, which also serves as a reference pressure. Line 17 opens to the tank above the level of a liquid indicated generally at 20 that is within the tank.

Each tank flange 16 is an ANSI or DIN standard flange, which is used for coupling instruments to tank ports and is an industry standard flange. Flange 16 has a neck 16A (see FIG. 3) which is welded onto a tank wall 10A and an outer flat, annular flange 16B which has a standard bolt hole configuration. Flange 16B also has a flat face 16C against which other adapters or couplings can be mounted for the pressure sensor used in measuring liquid levels. It is desirable to minimize crevices between parts, and to keep the transmitter mounting as close to the tank wall 10A as possible to avoid excessive overhangs in which where mechanical damage is likely to occur. The tank wall bulges out from being filled, and the wall section may bend out from a true vertical position to cause the flanges and connected transmitters to tilt, thereby changing the spacing between high pressure isolators, which introduces error into density measurements. The farther away the transmitter is from the tank wall, the greater the difference between the central axes of the ports indicated at 16D of the tank flange and the level of the inlet isolation diaphragm which transmits the hydrostatic pressure being sensed to the pressure sensor. This difference in level between two transmitters caused by tilt can cause an error in reading density that cannot be compensated because it is not repeatable. The bulge and the tilt can change from time to time with different levels, pressures or temperatures in the tank.

In order to accommodate a coplanar inlet differential pressure transmitter, which can operate without an oil filled leg as a reference pressure, the present adapter housing indicated generally at 25 is provided. This adapter housing 25 provides for close coupling of the transmitter, as well as passageways that are not full of crevices or places where air bubbles or contaminants can lodge.

Figure 2:
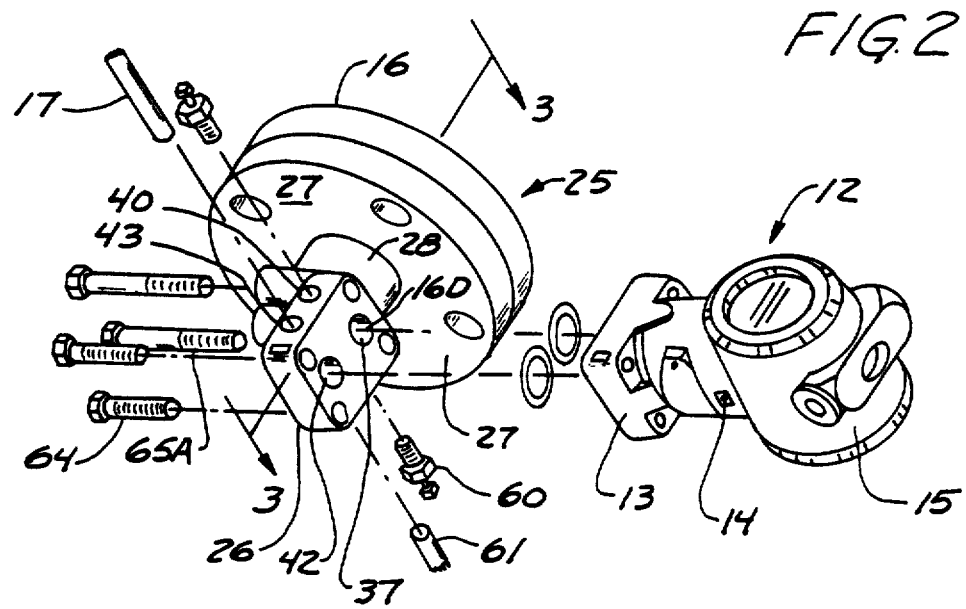
FIG. 2 is a schematic exploded representation of the adapter of the present invention with a transmitter illustrated in position thereon.
Figure 3:
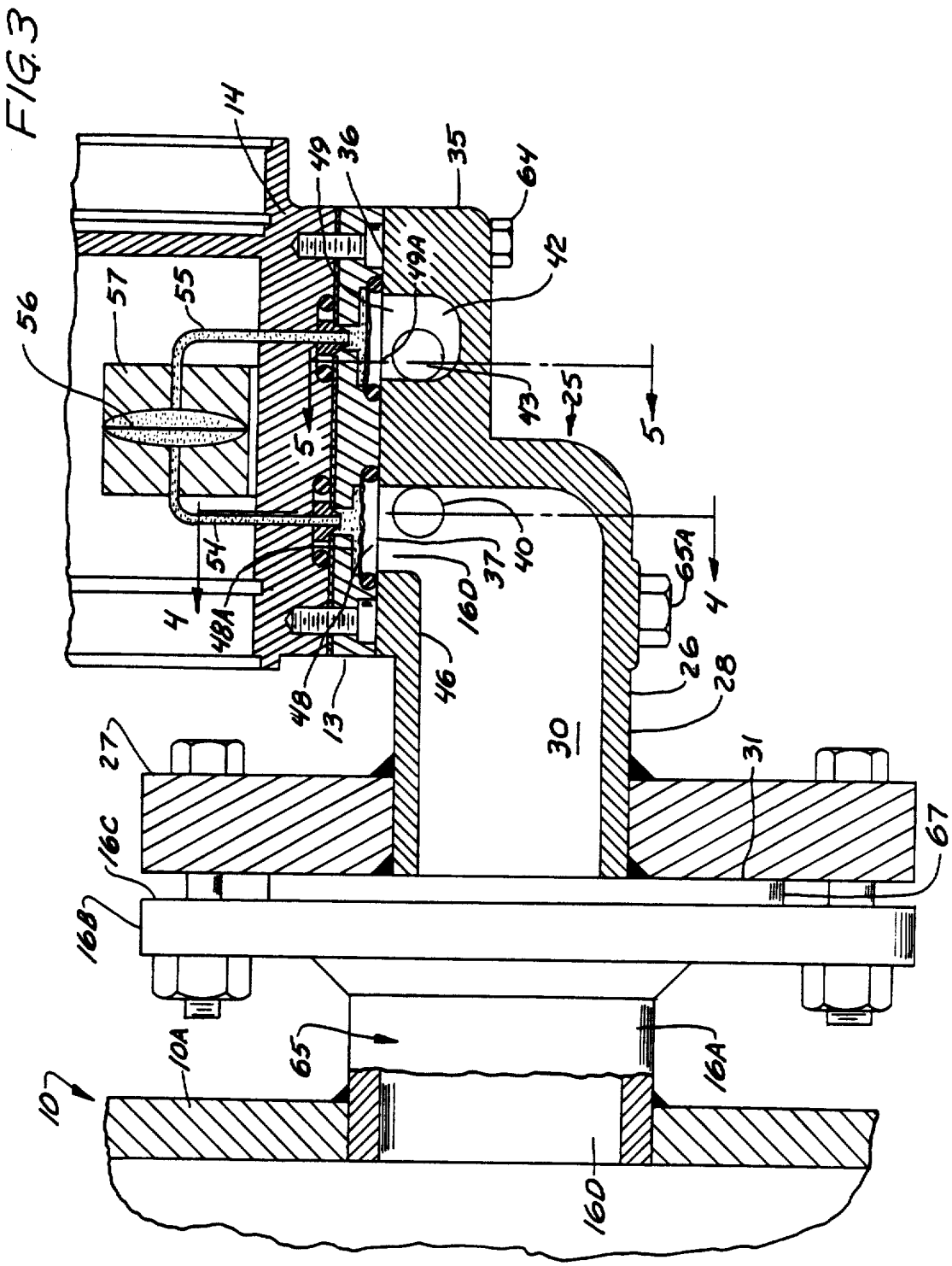
FIG. 3 is a sectional view taken as on line 3—3 in FIG. 2.

In FIGS. 2 and 3, the adapter housing 25 includes a main body 26 that has a flange 27 mounted to a neck 28. The flange 27 can be changed in manufacture by casting the body 26 and welding the flange 27 in place on the neck 28. The neck 28 has an inlet passageway 30 on the interior which opens to port 16D and receives the high pressure process fluid from the tank 10 through the port 16D. The flange 27 has bolt holes matching those of the flange 16B. A suitable gasket 31 is placed between the faces of the flange 16B and the flange 27 for sealing purposes.

The body 26 has an integrally formed support platform 35 that has a planar upper surface 36. The upper surface 36 has a passageway portion 37 of main inlet passageway 30 opening thereto. A cross bore 40 which extends laterally across the platform section 35 is formed in the body 26. The cross bore 40 has open ends on opposite sides of the platform member leading from passageway portion 37. A fluid connection is provided between the main passageway 30 and passageway portion 37 to the cross bore 40 that leads to the exterior.

Figure 4:
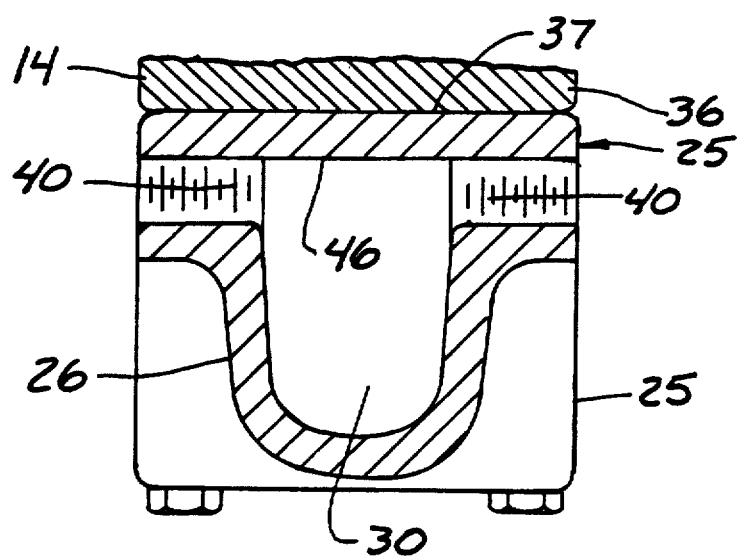
FIG. 4 is a sectional view taken as on line 4—4 in FIG. 3 with parts in section.
Figure 5:
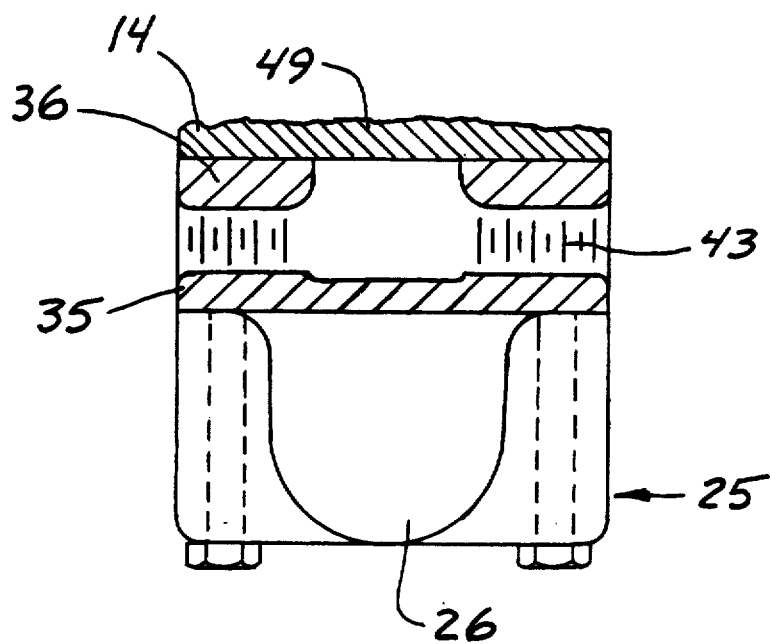
FIG. 5 is a sectional view taken as on line 5—5 in FIG. 3.

The platform section 35 further has a chamber 42 defined therein which opens to the planar surface 36. A cross bore 43 formed in platform section 35 is formed parallel to the cross bore 40 and opening on the opposite sides of the platform section as can be seen in FIG. 5. The cross bore 43 opens to chamber 42. Both the cross bore 40 and the cross bore 43 are threaded at their opposite ends as can be seen in FIGS. 4 and 5 for receiving plugs, drain plugs, or fittings for connection to pressure sources remote from the tank or vessel. The bore 43 can be connected to the line 17, as shown in FIG. 1 to couple a reference pressure to two transmitters.

Isolator chambers 48 and 49, respectively of the isolator section 13 of the transmitter 12 mate with passageways 37, 42. The chambers 48 and 49 are closed with isolator diaphragms 48A and 49A, respectively, in a known manner.

The sensor housing 14 of the transmitter has a pair of passageways or tubes 54 and 55, respectively that are sealed with respect to the isolator chambers formed on the backside of the diaphragms 48A and 49A. The isolator chambers are filled with a noncompressible fluid on the back side of the isolator diaphragms, and will transfer pressure to a sensing diaphragm 56 that is mounted in a sensor block 57 inside the sensor housing 14. The diaphragm 56 deflects in opposite directions, depending upon the differential in pressure between the isolator diaphragms 48A and 49A, so that the difference between the pressure head of the tank or vessel present at port 16D, and a reference pressure present in the chamber 42, and thus acting on diaphragm 49A, is sensed.

The adapter housing 25, as shown, has the port from chamber 37 which carries the pressure from the port 16D very close to the flange 16B and thus to the tank wall. The reference pressure opening from chamber 42 is spaced away from the tank 10 a greater amount. Thus, if any bulging of the tank wall occurs, it tends to move the flange 16B out of a vertical position. The amount of tilting of the transmitter and resulting vertical movement of the isolator diaphragm 48A is minimized with the present adapter, to insure accurate readings between differing levels of liquid in the tank for density. The body 26 of the adapter housing 25 comprises coupling means that couples the isolator diaphragms of the differential pressure transmitter to pressure openings to be sensed and the surface 36 surrounds the first and second pressure outlets of the adapter housing 25.

The cross bore 40 can have a suitable drain plug therein at each of the opposite ends, as shown at 60 in FIG. 2, and these can be on either side, to permit draining, bleeding of bubbles, straight through flushing and/or calibration inputs.

Likewise, the plugs shown at 61 that are used to close cross bore 43, which opens to the chamber 42, can be removed to permit connection of chamber 42 to separate pressure sources or as a common connection for chamber 42 on another transmitter.

The integral drain/vent ports or passageways such as cross bore 43, are located close to the active isolating diaphragm for convenience. Venting bubbles and draining fluid for zeroing or sludge removal is important in many applications of this type because of the high accuracy and special location requirements. The tanks 16 are rarely drained so the level sensing transmitter 12 may be isolated from the tank with a blind plate 67 in place of gasket 31 for service from time to time to block off flow into the passageway 30. This permits the transmitter 12 to be drained, flushed and zeroed by using the drain plug 60 or a plug 61. The cross bores 42 and 43 also allow users to attach pressure sources to check the span of the transmitter. Any air bubbles that come in after a transmitter has been out of service by the use of valve 65 must be bled out of the adapter housings and the cross bores permit this to be done easily.

The removal of a transmitter 12 and subsequent replacement is quite easy, by replacing the bolts shown in FIG. 2 at 64 and 65A, respectively, that are used for clamping the platform portion 35, and the isolator block 13 together for sealing.

Further, the internal passageway 30 has a maximum size and the draft angles that are used in the casting are designed to allow bubbles to migrate away from the isolating diaphragm 46. It should be noted that with the transmitter up out of the way, the flange bolts that clamp the flange 27 to the flange 16B are accessible, which aids greatly in field mounting.

Although the present invention has been described with reference to preferred embodiments, workers skilled in the art will recognize that changes may be made in form and detail without departing from the spirit and scope of the invention.

What is claimed is:

1. An adapter for coupling first and second isolators of a pressure transmitter to a fluid at a first pressure and a liquid presenting a hydrostatic pressure to a flanged opening, comprising:

a flange having a central port receiving the liquid from a front flange face of the flange mating with the flanged opening, the flange having an opposite back side;

coupling means disposed on the back side for coupling the first and second isolators to the first and hydrostatic pressures, respectively, the coupling means having a surface surrounding first and second spaced apart coplanar pressure outlets opening to the first and second isolators, respectively;

the adapter including a first passageway coupling the first pressure to the first outlet, and a second passageway isolated from the first passageway, the second passageway coupling the hydrostatic pressure from the central port to the second outlet; and the surface being arranged to placed the central port closer to the second outlet than the first outlet so that, when the flanged opening tilts, elevation changes between the central port and the second isolator are reduced.

2. The adapter of claim 1, wherein said flange comprises a first flange having a neck portion, with a first flange plate thereon mating with a standard flange on a tank, said first flange being selectable for different pressure duties and weldable to the neck portion.

3. The adapter as specified in claim 1 wherein said first outlet comprises a chamber defined in the flange, and a bore in the adapter opening to said chamber at a location other than the surface that surrounds the first and second coplanar pressure outlets.

4. The adapter of claim 1, and a separate second bore in the adapter opening to the second outlet, said second bore being positioned so that fluid in at least a portion of the second passageway will be drained when the second bore is opened.

5. The adapter of claim 1 wherein the coupling means comprises a housing having a short neck defining the central port and for supporting a flange ring separately attached to the neck to form the first mentioned flange.

6. The adapter of claim 5 wherein the flange ring attached to the neck is of size to match the range of pressures at the flanged opening.

7. The apparatus of claim 1 wherein the surface surrounding the pressure outlets is at a level above the central port with the coupling means attached to the flanged opening.

8. An adapter for coupling a transmitter having differential pressure sensing means therein to a port of a vessel providing a hydrostatic pressure, the transmitter having first and second pressure inlets that open to a common planar surface, comprising:

a housing defining a central port and having a substantially flat front face lying along a plane;

a first passageway defined in said housing leading from the central port to a first outlet in a second surface and opening to the first pressure inlet of the transmitter, where the second surface is substantially perpendicular to the front face; and the second surface having a second outlet therein opening to the second pressure inlet of the transmitter, the second outlet opening to a second passageway isolated from the first passageway, where the first outlet is positioned closer to the front face than the second outlet.

9. The adapter as specified in claim 8 and cross bore means adjacent the second surface, and defined in said housing to individually and separately intersect the first and second passageways in the housing to provide a second separate opening to each of the passageways.

10. The adapter as specified in claim 9 wherein said port leading to said first passageway permits draining at least a portion of fluids in said first passageway.

* * * * *

UNITED STATES PATENT AND TRADEMARK OFFICE
CERTIFICATE OF CORRECTION

PATENT NO. : 4,993,754

DATED : February 19, 1991

INVENTOR(S) : James E. Templin, Jr.

It is certified that error appears in the above-identified patent and that said Letters Patent is hereby corrected as shown below:

Col. 5, line 14, delete "placed", insert --place--.

Signed and Sealed this

Eleventh Day of August, 1992

Attest:

DOUGLAS B. COMER

Attesting Officer     Acting Commissioner of Patents and Trademarks